4 Sheets—Sheet 1.

H. FAIRBANKS.
SELF REGISTERING WEIGHING SCALE.

No. 107,239.          Patented Sept. 13, 1870.

Witnesses.        Inventor.

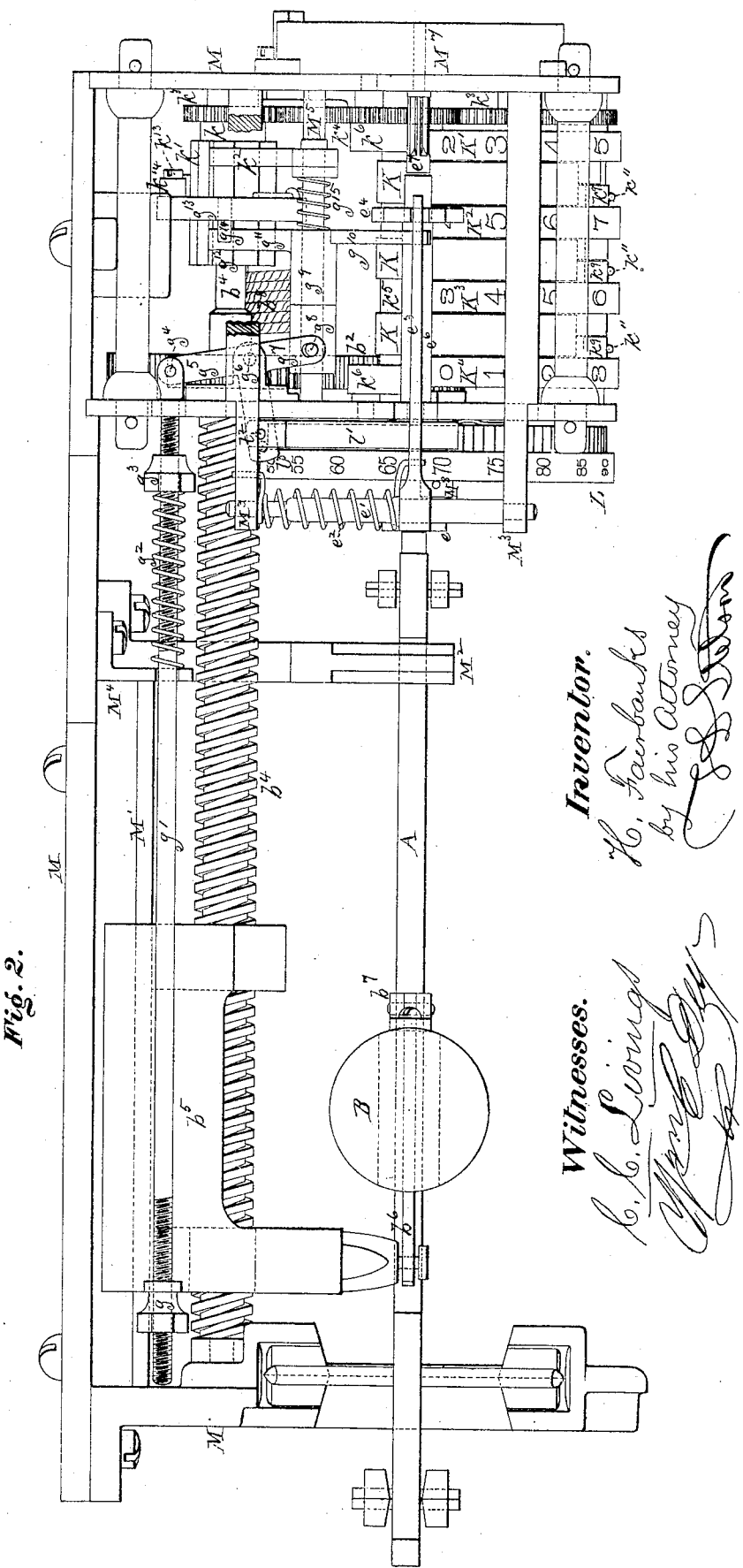

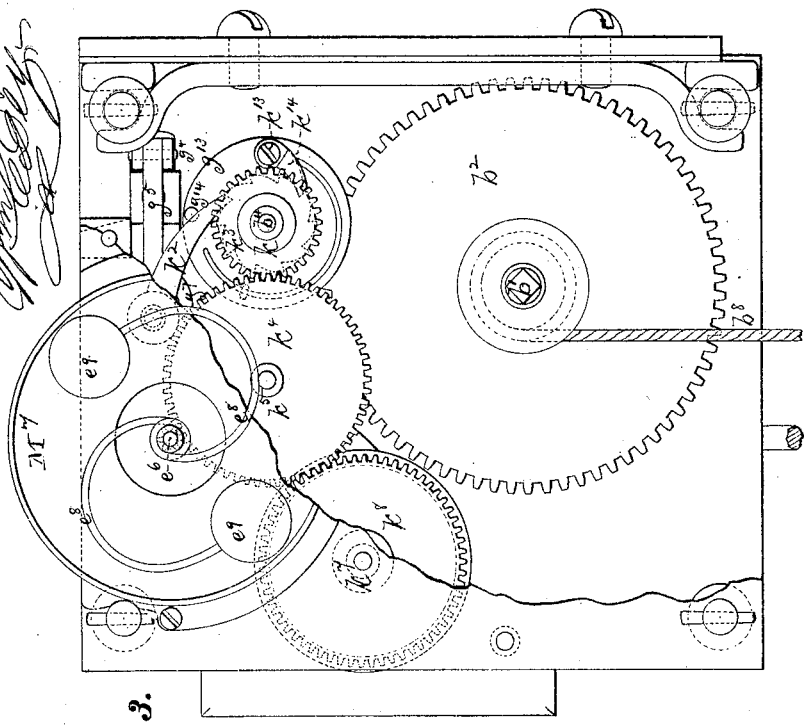

H. FAIRBANKS.
SELF REGISTERING WEIGHING SCALE.

No. 107,239. Patented Sept. 13, 1870.

United States Patent Office.

HENRY FAIRBANKS, OF ST. JOHNSBURY, VERMONT.

Letters Patent No. 107,239, dated September 13, 1870.

IMPROVEMENT IN SELF-REGISTERING WEIGHING-SCALES.

The Schedule referred to in these Letters Patent and making part of the same

*To all whom it may concern:*

Be it known that I, HENRY FAIRBANKS, of St. Johnsbury, in the county of Caledonia, in the State of Vermont, have invented certain new and useful Improvements in Weighing-Scales, or means of ascertaining and indicating weights; and I do hereby declare that the following is a full and exact description thereof.

I denominate my improved scale a registering-scale. It has long been common to register or indicate plainly to the eye the number of revolutions of a steam-engine and various analogous matters by means of figures on wheels, mounted side by side, and so connected together by other mechanism that the motion given to the units wheel imparts the proper slower intermittent motion to the tens-wheel, and this again to the hundreds-wheel, and so on indefinitely.

I have combined such a mechanism with a weighing-scale, and have provided means whereby the operation of weighing and registering is mainly automatic, and the machine may be worked successfully and reliably by very ignorant and unskilled workmen.

I will proceed to describe what I consider the best means of carrying out my invention, and will afterward designate the several parts which I claim as new therein.

The accompanying drawing forms a part of this specification.

Figure 1:
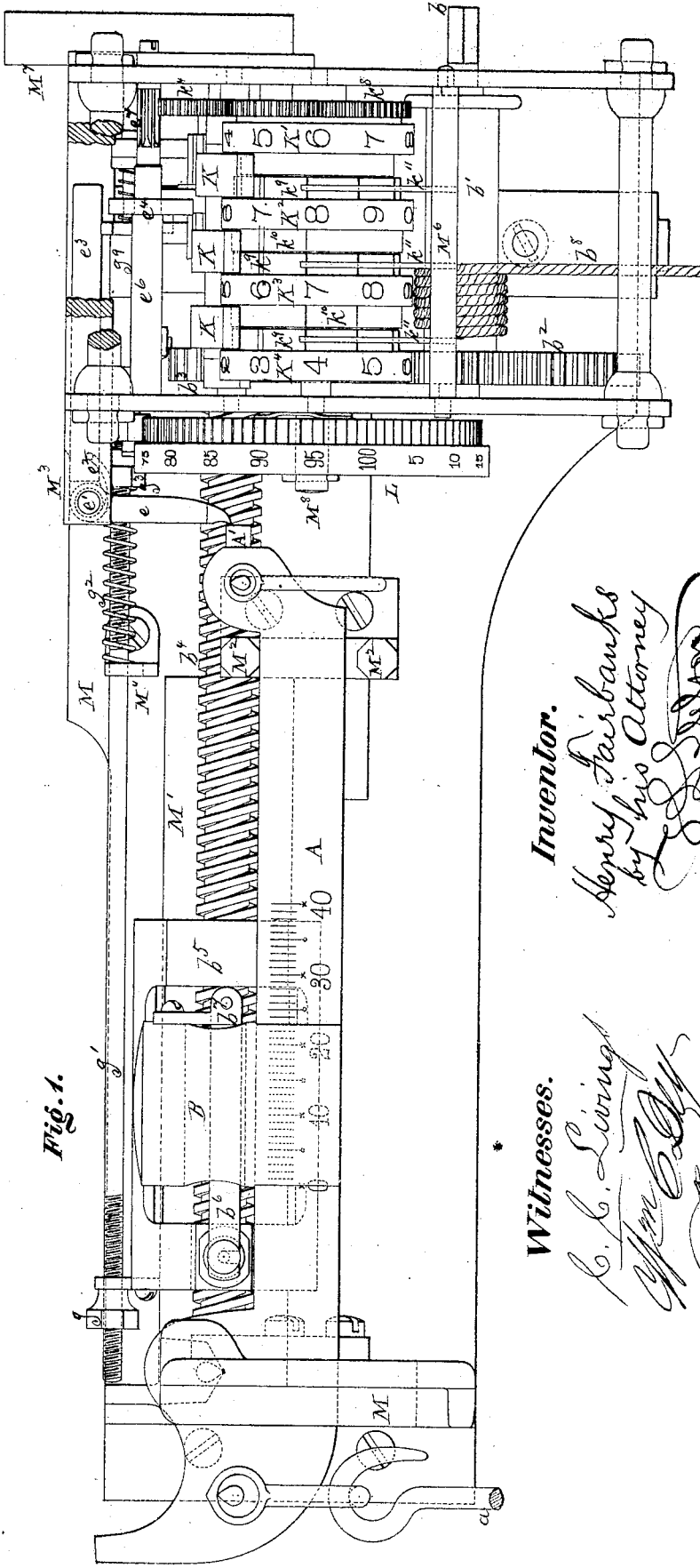
Figure 5:
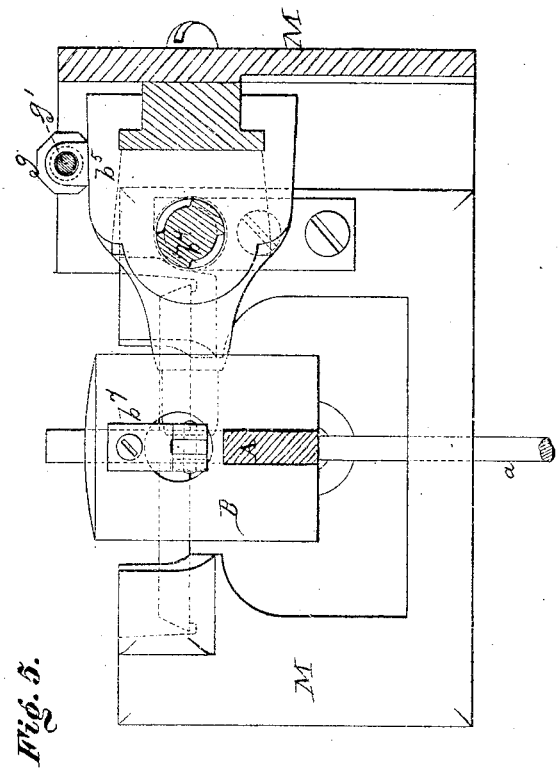

Figure 1 is a front view of my improved machine.
Figure 2 is a plan view of the same.
Figure 3 is an end view, with a part of the end plate broken away to show the mechanism.
Figure 4 is a cross-section through the registering mechanism; and
Figure 5 is a cross-section through the beam, the screw which transmits motion to the poise, the guide of the poise-mover, and the frame.

Similar letters of reference indicate like parts in all the figures.

A is the beam of a platform or other scale, of ordinary or suitable construction. I have not considered it necessary to represent the platform, the supporting levers, and other ordinary mechanism by which the weight of the load is transmitted to the important member termed the weighing-beam.

The rod by which the force is made to move the beam A is indicated by $a$. I shall indicate the framework wherever necessary by the letter M, and any special member of the frame-work by $M^1$, $M^2$, &c. A guide, $M^1$, is provided on the frame-work, to steady the motions of the poise-slider, and stops, $M^2$ $M^2$, are provided, to limit the extent of the vibrations of the beam A.

B is the poise. It is slid outward, or to the right, on the beam A, by turning the hand-crank, $b$, in one direction, and is moved inward, or to the left, on the beam by turning the same hand-crank $b$ in the opposite direction. The train of mechanism, $b$, $b^1$, $b^2$ to $b^7$ and $b^6$, by which this is effected, turns the screw $b^4$ in one direction or the other, and thus correspondingly moves the poise-slider $b^5$, and, through the medium of the light rod $b^6$, which makes a connection with the poise at the point $b^7$, pushes out or draws in the poise on the beam A. The parts in the train of connecting mechanism are the shafts $b^1$, carrying a gear-wheel, $b^2$, meshing into another gear-wheel, $b^3$, fixed upon a continuation of the endless screw $b^4$.

I prefer that the upper edge of the beam A shall be perfectly smooth. The ordinary graduations may be made on the broad front face of the beam. My improved machine may be used in weighing in the ordinary manner by simply disconnecting the other work, if it shall ever become necessary.

I will describe the action of my machine by directing the attention successively to the several parts in each train of mechanism which performs an important function. I will premise, generally, that the hand-crank $b$ turns successively in opposite directions. It is turned by the hand to the right, until the poise is slid back, or to the left on the beam A to the zero point. Now, it is stopped, forcibly, by means which will be described further on, and next the crank $b$ is turned in the reverse direction, either by the hand of the attendant, or by the action of a spring or of a weight pulling on a cord wound upon the axis $b^1$, and this motion revolves the screw $b^4$ in such direction as to traverse the poise B slowly outward, to the right.

I will now describe the action of another train of mechanism which stops the reverse motion of the crank $b$, when the poise has been moved out to exactly the proper extent, and the correct weight ascertained.

There is a bell-crank lever hung above upon a shaft, $e^1$, fixed in arms $M^3$, forming a part of the fixed frame-work M. The vertical or hanging arm of this lever, as also the entire lever, when it becomes necessary to refer to it, is denoted $e$, and stands with its lower extremity close to the nicely finished steel extension-piece $A^1$ of the beam A. There is a coiled spring, $e^2$, coiled around the shaft $e^1$, and tending to press the arm $e$ toward the beam A, and, consequently, to depress the horizontal arm $e^3$.

So long as the beam A is in its highest position, the arm $e$ presses lightly, at intervals, against the end of the extension $A^1$, and the arm $e^3$ is thereby supported, while a notch, $e^5$, in the wheel $e^4$, to be described below, is passing, and prevented from dropping into the notch, except to a very small extent, from which it is immediately lifted out again by the beveled form of the notch; but, when the beam A sinks, by reason of the poise B having been slid outward until the proper weight is ascertained, then the extension piece $A^1$ of the beam A is carried below the end of the hanging arm $e$, and leaves the bell-crank lever $e^3$ free the next time the notch $e^5$ is presented, to turn by its gravity, and, by the action of the spring $e^2$ to depress the arm $e^3$ deeply into the same notch, and thereby stop the wheel.

The wheel $e^4$ forms a part of another train of mechanism to be described below. It is revolved rapidly, while the poise B is being moved slowly outward, and its notch, $e^5$ is adapted to receive the horizontal arm $e^4$ of the lever before described, whenever such lever is allowed to sink. So soon as the beam A is sunk out of contact with the arm $e$, the lever $e^3$ drops into the notch $e^5$, and arrests the motion of this wheel, and, consequently, of the entire connected train of mechanism.

This function cannot be fully understood until the other trains of mechanism and their relations thereto are explained, but, having now described the immediate and direct effect of the sinking of the beam A, to drop the lever $e^3$ into the notch $e^6$, and thus, by arresting the quickly moving wheel $e^4$, to arrest the hand of the operator, and the entire train of mechanism $b^1$ to $b^7$, I will describe what takes place on the reverse movement, and will afterward explain how the movement of the machinery in the one direction registers the weights of the successive loads.

The attendant, so soon as the load to be weighed is fairly placed on the platform, not represented, so that its weight is properly transmitted through the rod $a$ to the beam A, seizes the crank $b$ and turns it to the right, and thus turns the endless screw $b^4$ in the direction which moves the poise B inward, to the left. As it approaches the zero mark the poise-slider $b^5$ strikes a nut, $g$, which is adjustable on a rod, $g^1$, so supported that it may move endwise to a limited extent. It is pressed to the right by a coiled spring, $g^2$, acting between the supporting-bracket $M^4$ and an adjustable nut, $g^3$, and is connected by the pivot $g^4$ to a lever, $g^5$, pivoted on the fixed frame-work at the point $g^6$, and having a forked arm, $g^7$, at the opposite extremity, the function of which will presently appear.

Now, when the poise-slider $b^5$ strikes the nut $g$ and moves the rod $g^1$ to the left, the parts are so adjusted that, just as the poise B has reached the zero-mark on the beam A, the rod $g^1$ has been moved so far to the left that it rocks the lever $g^5$ $g^6$ $g^7$, and moves the end $g^7$ to the right.

The forked arms $g^7$ take hold of pins $g^8$, on a sleeve, $g^9$, which is capable of sliding endwise, as also of turning to a limited extent on a smooth, cylindrical rod, $M^5$.

This sleeve $g^9$ carries two nearly opposite arms, the one, $g^{10}$, extending forward under the lever $e^3$, before described. The other, $g^{11}$, extends backward and fulfils the important function of arresting the motion of the entire mechanism so soon as the sleeve $g^9$ is moved endwise to the right, as before described. This is accomplished as follows:

There is a broad ratchet-wheel, $g^{12}$, on the extended shaft of the endless screw, $b^4$. The pawl $g^{11}$ catches in this ratchet $g^{12}$ whenever it is depressed. This pawl $g^{11}$ remains elevated, and the screw $b^6$ may turn freely until the end motion of the sleeve $g^9$ and its connections to the right is completed. This end motion carries the arm $g^{11}$ under a pin, $g^{14}$, which is fixed in the wheel $g^{13}$, carried on the extension of the same shaft, $b^6$.

The parts are so arranged that the end motion of the sleeve $g^9$ carries the pawl-arm $g^{11}$ into the path of the pin $g^{14}$, and at the next revolution the pin $g^{14}$ strikes on the upper side of the pawl-arm $g^{11}$, and presses it down into the ratchet $g^{12}$.

It follows from this that the backward motion of the hand-crank $b$ and its connections, to traverse back the poise B, is arrested by the forcing down of the pawl $g^{11}$ into the ratchet $g^{12}$ so soon as the poise B has reached the zero-mark on the scale A.

It will now be understood that the attendant has simply to turn the crank $b$ to the right until it stops, and then to turn it to the left, or in the reverse direction, (or allow it to be turned to the left by the action of an attached weight and cord,) until it is again stopped, and that this completes the weighing operation, so far as the action of the attendant is concerned.

I will presently describe the action of the registering-mechanism which takes place in the interim.

It will be understood that the cord $b^8$ and its weight may be used as a substitute for hand-power in inducing the reverse motion.

The weight may be inclosed in a suitable casing or well, if necessary, to protect it from disturbing influences. With this pulley and weight it is not necessary that the attendant shall turn the crank, except in the forward direction; but he turns it forward until it stops, and then liberates it, and it then turns slowly backward by the action of the weight acting through the cord $b^8$, and thereby transmitting its motion to the shaft $b^1$ and its connections. Where such weight and cord are not used, it is necessary that the attendant shall retain his hold on the crank $b$, and shall turn it slowly backward until it is stopped. In either case it is not essential to success that a special attendant be stationed at the scale. The laborers who operate the wheelbarrows, or who drive the wagons, or brake, or otherwise attend on the cars or other mediums by which the loads are successively transported to and from the scale, may each in succession, when properly instructed, operate the scale in the simple manner required.

A sleeve, $k$, is mounted loosely on the extended shaft of the endless screw $b^4$.

This sleeve carries a ratchet, $k^1$, which receives a pawl, $k^2$, hung on the rod $M^5$, before described. This pawl prevents the ratchet $k^1$ and its connections revolving, except in one direction, that is, during the motion of the poise B outward. During this motion the sleeve K is turned with the screw $b^4$ by means of a pawl, $k^{14}$, hung by the pin $k^{13}$ on the wheel $g^{13}$.

There is a gear-wheel, $k^3$, fixed on the sleeve $k$, and which gears into a larger wheel, $k^4$, on a cranked shaft, $k^5$.

The crank $k^6$ on this shaft $k^5$ is peculiarly constructed. It is strong, and of sufficient length to carry three pawls, K K K, adapted to work corresponding register-wheels.

The register-wheels are mounted on a shaft, $k^7$, and are denoted successively, $K^1$ $K^2$ $K^3$ $K^4$.

The units-wheel, $K^1$, is attached firmly to a gear-wheel, $k^8$, which meshes into the gear-wheel $k^4$, before described. Every revolution of the cranked shaft $k^5$ gives a corresponding revolution to the units-wheel $K^1$.

The wheels for the tens, hundreds, &c., are worked entirely by pawls from the crank $k^6$.

The pawl K takes in notches $k^9$ on the right-hand face of the tens-wheel. There are corresponding notches, or, in short, a ratchet-wheel fixed on the right-hand side of the wheel, for hundreds, for thousands, and for as many more wheels as may be used.

The pawl K catches a tooth of the ratchet $k^9$ at each revolution of the crank $k^6$, but the pawl K does not catch in the ratchet in the hundreds-wheel, except once for each revolution of the tens-wheel. The action in this respect is, probably, analogous to that of many registering-wheels before known.

After ten revolutions of the crank $k^6$, a recess, $k^{10}$, on the left-hand side of the tens-wheel, allows the next pawl K to sink low enough to take one of the teeth of the ratchet $k^9$ in the hundreds-wheel, and thus to move that one notch and present a new number.

After a complete revolution of the hundreds-wheel a corresponding notch, $k^{10}$, on the left side of this wheel, allows the next pawl K to descend and to act on one tooth of the ratchet $k^9$ on the thousands-wheel.

It follows that the figures imprinted, embossed, or otherwise made visible on the units, tens, hundreds, and thousands-wheels, are rotated properly to indicate to the eye in the front line of figures the aggregate number of pounds weighed during and at the close of a long series of successive weighing operations. A cross-bar or other suitable aid may be employed to assist the eye in reading the numbers across properly.

These figures may be raised, and a suitable strip of paper being drawn across, the figures may be imprinted on the paper by a properly administered blow of a suitable hammer or other appropriate mechanism, either at the close of the operation or after each successive weighing, if preferred.

I have in another application for patent, of even date herewith, described in detail a machine for printing the weights upon a strip of paper. That description is too long to be made a part of this specification, but I wish here to record that I propose to use that mechanism, or the vital parts of it, in connection with the machine here described, in order to print the aggregate weights here recorded, by printing from the wheels $K^1$ $K^2$, &c., here described, or in order to print the separate weight of each load upon a strip of paper from another set of wheels in the manner described in my other said application for a patent.

The two modes of indicating the weights may be useful as a check upon each other, as a safeguard against experiencing any serious results from mistake or derangement in the action of any part.

Returning now to the mechanism of the registering-scale here represented, it will perhaps have been noticed that I have left some parts without a complete and full description. I will now endeavor to supply any such omissions, although it is possible that in most cases the drawing has already sufficed to make the points clear.

I have explained how the motion of the poise-slider to the left draws the rod $g^1$ to the left, and moves the sleeve $g^9$ and its connections to the right, to effect the automatic stopping of the crank $b$ and its connections, so soon as the poise has reached the zero-mark. But I did not describe the means whereby this sleeve $g^9$ is returned or slid back to its original position, when the poise-slider $b^5$ commences again to move outward, to the right. This is partly due to the action of the spiral spring $g^2$, which urges the rod $g^1$ to the right so soon as it is liberated, and is due partly to the coiled spring $g^{15}$, not before described, which acts directly against the sleeve $g^9$, pressing it to the left, out of the path of the pin $g^{16}$.

It will be seen that the connection of the forked end $g^7$ of the lever $g^5$ to the pins $g^8$ and the sleeve $g^9$ is made through the medium of slots, so that the sleeve $g^9$ may turn freely, to a limited extent, around the pin or guide $M^5$. I find, in practice, that it is better to allow a still freer tilting motion to the pawl $g^{11}$ and the opposite arm $g^{10}$, and I consequently divide what, for shortness, I denominate the sleeve $g^9$ into two parts, making the right-hand part perfectly free to turn. It rocks freely to any required extent on the smooth guide-rod $M^5$, and its contact with the other part of the sleeve $g^9$ and with the spring $g^{15}$ only affects its endwise position.

I have described that the lever $e^3$ sinks into a notch, $e^5$, in a quickly-rotating wheel, $e^4$, fixed on a shaft, $e^6$, and that it thereby serves to arrest the motion of the crank $b$ and its connections, including the registering-wheels and all the other parts of the mechanism, when the poise is moved outward to the proper extent, so that the beam A sinks and liberates the lever $e^3$. The drawing represents how this quick motion is received from the gear-wheel $K^4$ upon the crank-shaft $K^5$, through the small pinion $e^7$, which gears into the gear-wheel $K^4$, before described.

I esteem it an important point in my machine that $e^3$ rides on the wheel $e^4$ during most of its rotation, and, consequently, that the hanging arm $e$ does not touch $A^1$ except at intervals. This makes an intermittent or feeling contact, and the beam A is perfectly free to rise and sink without any friction therefrom during the intervals.

The wheel $e^4$ may have several notches, instead of one, as here represented. I have experimented successfully with five, and for some reasons prefer that number of notches; but it may have any number of notches. I prefer one notch for each pound, or for each figure on the units wheel.

Whatever the number of notches $e^5$ in this wheel $e^4$, there is a function performed by the arm $g^{10}$ in lifting the lever $e^3$ out of the notch the moment the opposite arm or pawl $g^{11}$ is depressed by the pin $g^{14}$, as before described. That action raises the arm $g^{10}$, and, consequently, the lever $e^3$, the moment the rod $g^1$ is pressed to the left. It is by this means that the hanging arm $e$ is moved outward beyond the end of the beam A and its extension $A^1$ at the commencement of each weighing operation.

I have not yet described my provision for governing the motion of the quickly-moving wheel $e^4$ and its connections. This is done by means of a pair of curved and highly elastic arms $e^8$, which are fixed on the overhanging end of the shaft $e^6$, and carry weights $e^9$, which traverse in close proximity to the smooth interior of the cylindrical fixed band $M^7$. When the velocity of the shaft tends to exceed the proper amount, the centrifugal force of the weights $e^9$ extends the curved arms $e^8$, and generates sufficient friction between the weights $e^9$ and the interior of the ring $M^7$ to retard the motion.

I have not described how the registering-wheels $K^2$, $K^3$, &c., are held against any accidental backward movements as the pawls K slip over them. This is effected by means of the springs $k^{11}$, which are fixed on a bar, $M^6$, and press on the respective ratchet-wheels, as represented.

I believe it practicable to employ any simple series of hands or indexes, working on successive dials, for hundreds, thousands, &c., in the manner commonly used for gas-meters, and with such a device many of the advantages of my invention may be realized; but I much prefer the registering-wheels working intermittently, as here described.

The mechanism now described registers the aggregate weight; but it is obviously convenient to know not only that, but also the aggregate number of the successive weighings. This I indicate by the wheel L, which is mounted on a stud, $M^8$, and is provided with fine graduations on its periphery, and with a correspondingly fine ratchet-wheel on its right-hand side. This ratchet-wheel is worked by the hooked pawl $l^1$, which is connected by the pin $l^2$ to an arm, $l^3$, fixed upon the lever $g^5$, before described. At each end movement of the rod $g^1$ the arm $l^3$ is moved in one direction or the other, and the hooked pawl $l^1$, at each round of operations of the machine, moves the wheel L one graduation, indicating that one more load has been weighed.

By turning the nut $g^3$, and thus changing its position on the rod $g^1$, the point is changed at which the poise B stands on the beam, when its backward motion is arrested; and although, however this may be adjusted, the beam A will always sink when the poise has been moved outward to the right weight, it will be observed that the machine only registers the amount of the motion outward to that point from the fixed point, whether zero or any other point, from which it commenced its outward movement. It will be seen, therefore, that by adjusting the nut $g$ in various potions on the rod $g^1$, the point at which the poise is arrested and commences to move outward may be varied within wide limits. By this means I can adjust the machine to allow for increased weight of platform, or any other cause due to repairs or the like, or I can allow for "tare" by adjusting the said nuts to allow for the weight of the heavy wagon or the like in which the load may be carried.

My improved scale is adapted for the addition of separate additional poises, to balance any permanent weight, as the weight of a wagon. This is done by attaching the weights, in any ordinary and suitable manner, to the link N, which is suspended to the knife-edge $n$, near the outer (or right-hand) end of the beam A. This is, in short, a counter-weight, and it performs all the functions of a counter-weight in my machine. I allow for it by adding a corresponding amount for each time the weighing is effected, ascertained by means of the counter-wheel L, or otherwise.

Ordinarily the works of the machine will not be made accessible to the attendants or workman. The proprietor or superintendent adjusts the scale, and locks up the casing of the machine, and, at the end of the day's work, or at any other period, he observes and records the amount registered. The face of the casing should be of plate glass or other transparent material, and adapted to be properly lighted. For facility of reading, it is well to provide a bar or other suitable guide for the eye, not represented, which should extend across in front of the register-wheels, and out of contact therewith.

At the end of a succession of weighings, or at any other time when it is necessary, the case may be opened and all the wheels set back, or rather forward, to zero, to commence a new series of weighing operations.

My mechanism guards very effectually against the serious derangement which might result from an accidental irregularity on the part of the workman in turning the crank $b$.

It will be observed that when a weighing has been effected and a new load placed upon the platform, the crank $b$ is capable of being turned only in one direction, that required to move the poise B inward to the left. This condition obtains throughout the entire inward movement of the poise. It is never possible to move the poise outward by turning the crank $b$ in the opposite direction, until it has been moved inward to the full and proper extent. This results from the action of the pawl $k^{14}$ in the ratchet $k^1$, which is connected by the parts $k^3$ $k^4$ with the quick-wheel $e^4$, which the lever $e^3$ continues to hold fast; but when the poise B has been moved inward to the full and proper extent, the pressing down of the pawl $g^{11}$ in the ratchet $g^{12}$ by the pin $g^{14}$, lifts the arm $g^{10}$, and consequently the arm $e^3$, and then, and not before, the machine is in such condition that the crank $b$ may be turned in the opposite direction.

Now, it may be turned in the opposite direction, that which moves the poise outward, and only in that direction. After the attendant has commenced to turn it in that direction, so that the poise is moving out, the motion of the crank $b$ cannot be again reversed until it has been moved out to the full extent and the beam A has dropped. This results from the action of the pawl $g^{11}$ on the ratchet $g^{12}$, which is firmly connected to the screw $b^4$.

Any attempt to reverse the motion of the crank is effectually arrested by this pawl and its connections, until the poise has been moved outward to the proper extent, and the beam A has sunk.

The sinking of the beam A berates the arm $e$, and consequently the arm $e^3$, and the gravity of this arm $e^3$ is sufficient, as it falls into the notch $e^5$ in the quick-wheel $e^4$, to depress the arm $g^{10}$, and to raise the pawl $g^{11}$ out of contact with the ratchet. These provisions are very important in avoiding the mischief which might otherwise result from careless, fraudulent, or mischievous irregularity in turning the crank $b$.

The bar $b^6$ is connected to the pin $b^5$ by a hook.

The poise can be disconnected from the operating mechanism, and the scale used in the ordinary manner, by adjusting the poise B on the beam A by hand, after simply unhooking this rod. The weight of this rod is slight; I can compensate for it exactly by providing a small weight to be attached on the opposite end of the beam A, or I can, if desired, balance the light bar $b^6$ by forming it with a heavy end extending beyond the pivot on which it is permanently hinged. Such a provision, with a spring catch for holding the hook-bar $b^6$ connected when in use, would avoid the necessity for any small weight to be applied when the piece is disconnected from its operating mechanism.

I term the inward movement of the poise and the rising of the beam the preparatory motions, and the outward motion of the poise and the sinking of the beam the weighing motions thereof.

These motions may be reversed, if desired, so that the rising of the beam shall be the weighing motion, the other machinery being correspondingly reversed, to match.

I am aware of various devices known before for moving a weighing-poise by mechanism carried on the scale-beam; but all such have involved a risk of disturbing the position of the scale-beam and interfering with its free action.

I am also aware of a plan by which parts moved independently of the scale-beam are made to communicate motion to the poise, but in such plan the motion is communicated by a force which, from its direction, disturbs the balance of the beam. I count it an improvement to communicate the motion to the poise from a poise-mover, $b^6$, mounted independently of the scale-beam, and transmitting the force in a direction in a line directly toward or from the supporting knife-edges at the time the weighing is determined. This is done in my machine.

I am also aware that a device has been before proposed and patented in England, for indicating or registering the weights of single loads, and for allowing the pointing by hand of the weights of such loads, but such would not, like mine, weigh successive unequal loads and register their sum. Many grain-weighing machines add the weights of successive equal loads, but none such can weigh and add unequal loads. My machine indicates the weight of such load separately, by the position of the poise upon the scale-beam, however unequal the said loads may be, and, by the combined registering mechanism, adds the weight of each load, whether equal or unequal to each other, to the amount previously weighed, and gives a correct indication of the sum without imposing any resistance to the weighing motion of the beam.

I do not limit my entire invention to the exact form and arrangement of each member of the mechanism, or to the combination of all the features of my entire machine; but having now described what I consider the best mode of carrying my invention into effect in all its several details,

I claim as follows:

1. The poise-slider $b^5$, moved in a path independent of the scale-beam B, but parallel to its position previous to its weighing motion, and so connected with the poise that the force exerted shall act in a line directly toward or from the supporting knife-edge of the beam, substantially as herein set forth.

2. The hook-bar $b^6$, connecting the poise-moving mechanism with the poise, adapted to allow its ready disconnection, in order that the scale may be used in the manner of the ordinary scale, when desired.

3. Extending the said connection through or past the poise, so as to reduce the angular motion without extending the mechanism.

4. A preparatory stop mechanism, controlled by the position of the poise upon the freely-tilting beam, as specified.

5. Making the preparatory stop adjustable, so as to vary the point from which registering commences, as herein set forth.

6. Using the weighing motion of the scale to release a weighing stop, which, on being released, stops the mechanism irrespective of the position of the beam thereafter, all substantially as and for the purposes herein set forth.

7. In combination with a weighing-scale and poise-moving mechanism, a weighing stop, adapted to not only stop the poise-moving mechanism, but also lock the registering apparatus and hold it until it is unlocked by the preparatory or backward motion of the machine, as specified.

8. The intermittent or feeling motion of the weighing stop mechanism, constructed and arranged substantially as herein specified, so that, while it is perfectly retained until the scale-beam moves, it shall only for very brief intervals interfere with that movement.

9. Providing ratchets or their equivalents, so arranged that neither the outward nor the inward motion of the poise can be reversed until the poise has made the entire traverse essential to correctly registering the weight of the load upon the scale, and providing for such reversals in connection with the preparatory stop and weighing stop, as herein set forth.

10. The duplex registering mechanism, registering both the sum of the weight and the number of the loads, in combination with a weighing scale, as specified.

11. The within-described machine, weighing variable loads by moving a poise upon a free scale-beam with automatic stops to arrest the motion of the poise in both directions, and adding and registering the sum of their weights, so that correctness does not depend upon mental effort or observation on the part of the operator, as specified.

12. The combination of, first, a weighing scale, adapted to weigh variable loads; second, an adding and registering mechanism, adapted to add and register the sum of the loads weighed; and, third, operating means working independently of and without disturbing or interfering with the weighing motion of the scale, all substantially as herein specified.

In testimony whereof I have hereunto set my name in presence of two subscribing witnesses.

HENRY FAIRBANKS.

Witnesses:
THADDEUS FAIRBANKS,
A. N. FAIRBANKS.